United States Patent [19]

Harben, III et al.

[11] Patent Number: 5,108,345
[45] Date of Patent: Apr. 28, 1992

[54] APPARATUS AND METHOD FOR LOADING LIVE FOWL ONTO A CONVEYOR

[75] Inventors: Grover S. Harben, III, 3319 Edgewater Ter., Gainesville, Ga. 30501; Gene Petty, Gainesville; L. Guy Clark, Dawsonville, both of Ga.

[73] Assignee: Grover S. Harben, III, Gainesville, Ga.

[21] Appl. No.: 674,578

[22] Filed: Mar. 25, 1991

[51] Int. Cl.$^5$ .................... A22C 5/00; A22C 21/00
[52] U.S. Cl. ................... 452/183; 452/188; 452/182
[58] Field of Search ............ 452/183, 182, 188, 167

[56] References Cited

U.S. PATENT DOCUMENTS

| | | | |
|---|---|---|---|
| 3,571,844 | 3/1971 | Stiles | 452/183 |
| 3,751,762 | 8/1973 | Dillon | 452/183 |
| 3,991,441 | 11/1976 | Giger, Jr. | 452/183 |
| 4,272,863 | 6/1981 | Parker, Jr. | 452/183 |
| 4,856,144 | 8/1989 | de Greer | 452/183 |

Primary Examiner—Willis Little
Attorney, Agent, or Firm—Jones, Askew & Lunsford

[57] ABSTRACT

Apparatus and method for mechanizing the loading of live fowl onto shackles of an overhead conveyor used in poultry processing. Live fowl are placed on a moving conveyor belt moving alongside the shackles. A succession of bird loading stations move with the bird conveyor belt and position the feet of each bird in predetermined relation with corresponding shackles. A foot folder engages the feet of the bird, confining the digits of the feet for unimpeded entry into the shackle. The shackles then are moved toward the bird conveyor to position the feet in the loops of the shackle, after which the shackles are elevated with respect to the bird conveyor to engage the feet within the shackles.

29 Claims, 10 Drawing Sheets

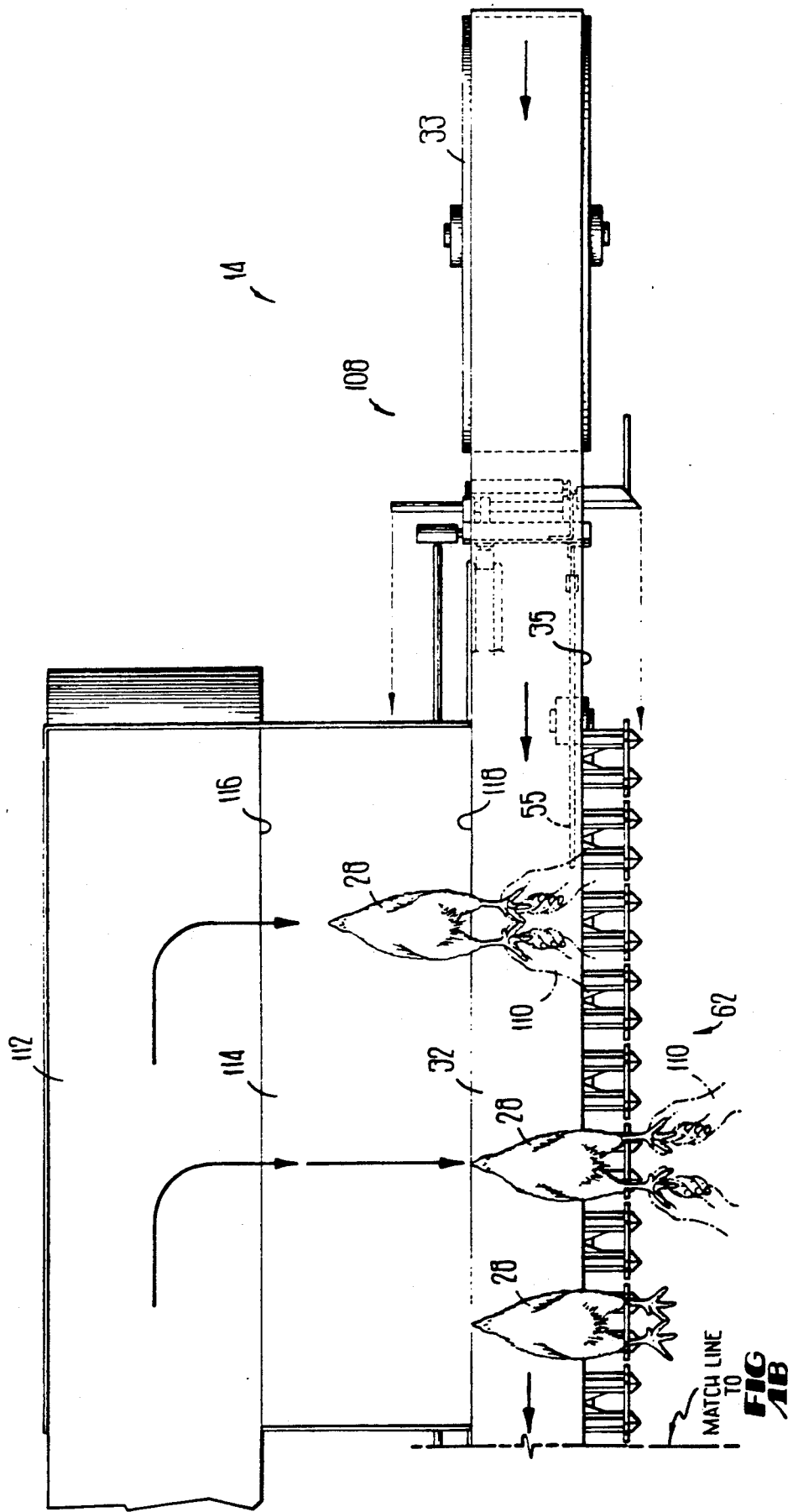

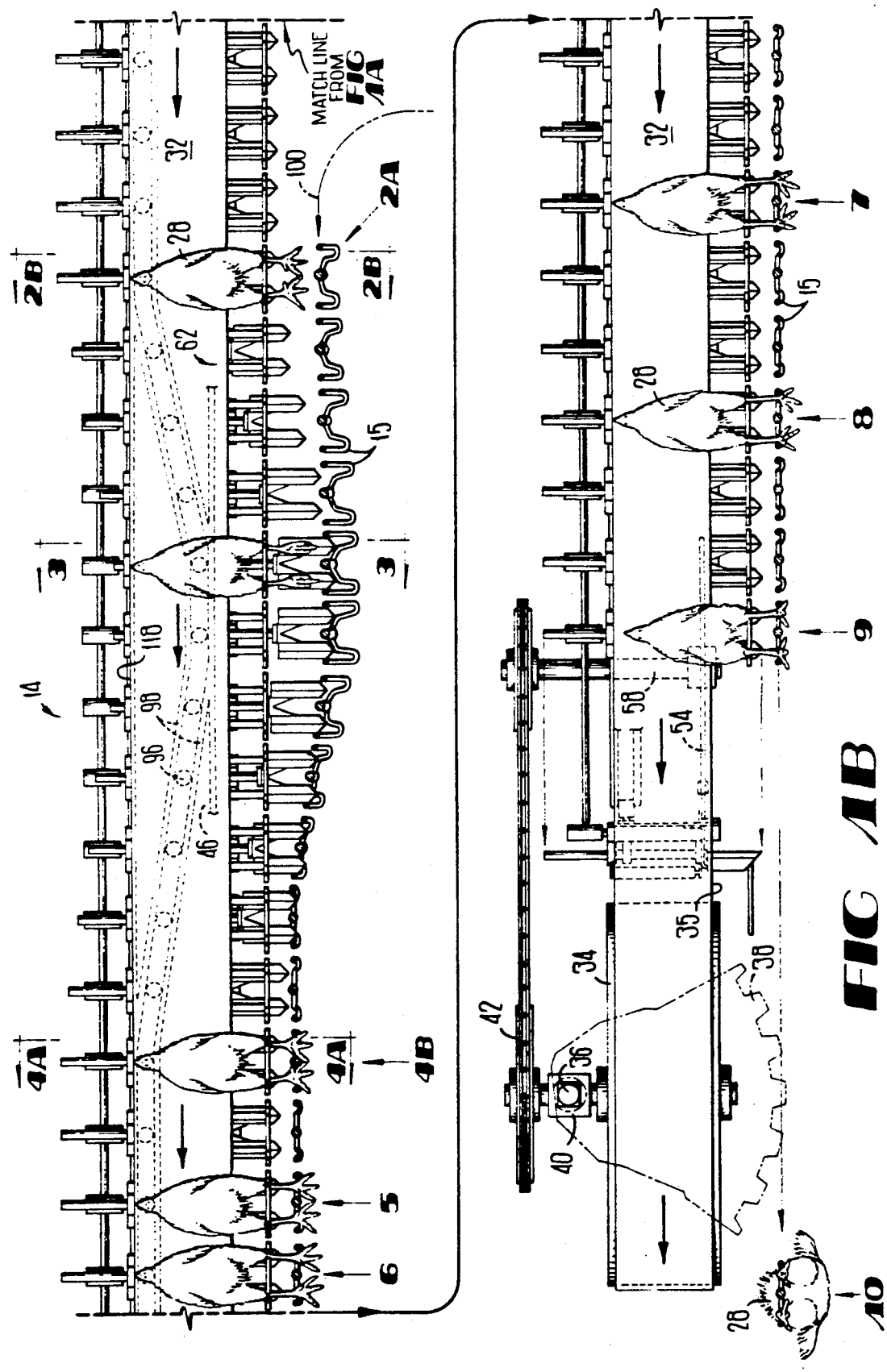

APPARATUS AND METHOD FOR LOADING LIVE FOWL ONTO A CONVEYOR

FIELD OF INVENTION

This invention relates in general to processing of live poultry, and relates in particular to loading domestic fowl onto an overhead conveyor line of the kind used in poultry processing facilities.

BACKGROUND OF THE INVENTION

Modern poultry processing facilities use a conveyor system to transport the carcasses of domestic fowl, such as chicken or turkeys, from one work station to the next during processing operations. The typical overhead conveyor system in a poultry processing plant includes an endless conveyor chain mounted on an overhead track assembly and driven at a desired speed by one or more motors. A succession of shackles is attached to the overhead conveyor chain and the shackles hang downwardly from that chain. Each shackle is intended to receive an individual fowl in a head-down configuration, and each shackle typically defines a pair of open-ended loops which engage and hold the feet of the fowl for that purpose. Overhead conveyor systems of the kind described are known to those skilled in the art.

Although poultry processing has become highly mechanized through the development of specialized machinery to perform most repetitive operations on the carcasses of freshly-killed fowl, loading the live fowl onto the conveyor shackles at the beginning of the processing line has eluded any significant mechanization thus far. An operator must physically grab each fowl by its legs, turn the fowl upside-down so the legs are uppermost, and then insert each leg through one of the loops in a shackle as that shackle moves past the operator standing alongside the overhead conveyor. Because the shackles are spaced closely together in succession along the conveyor line, the efforts of several different people are required to make sure the fowl is loaded onto each shackle in order to obtain maximum efficiency of the processing equipment located downline from the loading zone. Loading the fowl onto the conveyor shackles thus is labor intensive, especially as compared with other processing operations (e.g., plucking and eviscerating) that are substantially or completely mechanized. Moreover, the job of loading live fowl, which may have been kept penned for many hours immediately preceding the loading operation, onto conveyor shackles is known as one of the dirtiest and most unpleasant jobs in a poultry processing plant.

The prior art is sparse with regard to apparatus for automating or mechanizing the process of loading live fowl onto the shackles of conveyor lines. Published European patent application 89201624.7 (EPO Publication No. 355,037) contains a schematic showing of apparatus which causes fowl to stand up on a conveyor belt so that the legs can be placed to engage the shackles, presumably by a human operator. U.S. Pat. Nos. 4,301,770 and 4,307,683 disclose apparatus for gathering the live fowl at the farm and there attaching shackles that are separate from the conveyor at the processing plant. The shackled fowl are transported from the farm to the processing plant, at which the shackled fowl are removed from pens and the shackles attached to the overhead conveyor. The impracticalities of that latter scheme include the need for twice handling the fowl during separate shackling and loading operations, and the need to return the shackles from the processing plant to the farms for reuse. It is believed that no commercially-practicable apparatus existed for loading birds onto shackles of a conveyor system, prior to the present invention.

SUMMARY OF THE INVENTION

The present invention permits loading fowl onto the shackles of a conveyor with only a relatively small amount of exertion and attention by operating personnel. Stated in general terms, live fowl are moved along a path adjacent the conventional shackles hanging from an overhead conveyor line. A belt conveyor may be used for this purpose, with each fowl being initially placed thereon in predetermined spaced relation to one of the shackles. The shackles are spaced apart from the feet of the fowl at this time. The digits of the feet, which normally are spread out to an extent which prevents simply placing the feet in the shackles, now are confined so as to permit unimpeded movement of the feet into predetermined relation with the corresponding loops of the selected shackle. The distance between the shackle and the bird next is reduced, so that the feet become placed into alignment with the foot-engaging loops of the shackle. With the shackle and the feet thus aligned with respect to each other, the vertical spacing of the shackle relative to the bird is increased, drawing the feet into engagement with the shackle loops. The feet of the fowl thus become fully engaged by the shackle, so that the shackle carries the fowl from the loading location onto the next processing operation.

Stated in somewhat more specific terms, live fowl are placed on a moving conveyor positioned alongside a succession of shackles suspended from an overhead conveyor and moving with the fowl conveyor. The feet of each fowl are positioned on the secondary conveyor in predetermined relation with a corresponding shackle moving alongside the secondary conveyor. A member moving with the secondary conveyor engages each foot of the fowl, confining the digits of the feet for entry into the shackle. The lateral spacing between the shackle and the fowl then is reduced, so that the feet become positioned at an upper portion of the loops formed by the shackle. With the feet of the fowl thus positioned, the footholding apparatus can retract so that the digits are allowed to revert to their normal configuration splayed outwardly from the legs of the fowl. With the feet thus positioned in the upper part of the shackle, the vertical spacing between the shackle and the fowl is increased, preferably by raising the shackle relative to the secondary conveyor, preferably by elevating the shackle, so that the feet move to the bottom of the loops in the shackles. This movement also lifts the fowl off the secondary conveyor, completing the loading process and conveying the fowl to the next processing step.

Stated with somewhat further detail, the fowl are initially placed on the secondary conveyor with their feet engaged in a foot guide provided for that purpose and movable with the secondary conveyor. Associated with each foot guide is a foot folder which also operates to move with the secondary conveyor. Each foot folder preferably is in a retracted position relative to the foot guide where the fowl are placed on the secondary conveyor, and each foot guide thereafter moves generally toward the feet of the fowl to confine the digits to an area sufficiently small to permit positioning the feet within the upper end of the loops formed by a shackle.

As the distance between the shackle and the feet is reduced to position the feet within the shackle, the foot folder is withdrawn from the feet and the digits can splay outwardly or return to their natural position, this time within the loops of the shackle.

Accordingly, it is an object of the present invention to provide an improved method and apparatus for loading fowl onto a conveyor for processing.

It is another object of the present invention to provide an improved method and apparatus for loading fowl onto the shackles of a poultry processing conveyor.

It is a further object of the present invention to provide a more efficient method and apparatus for loading fowl onto the shackles of a conveyor used in processing operations.

Other objects and advantages of the present invention will become more readily apparent from the following discussion of a preferred embodiment.

BRIEF DESCRIPTION OF DRAWINGS

FIGS. 1A and 1B are matched portions of a plan view showing fowl loading apparatus according to a preferred embodiment of the invention.

DESCRIPTION OF PREFERRED EMBODIMENT

Figure 2A:
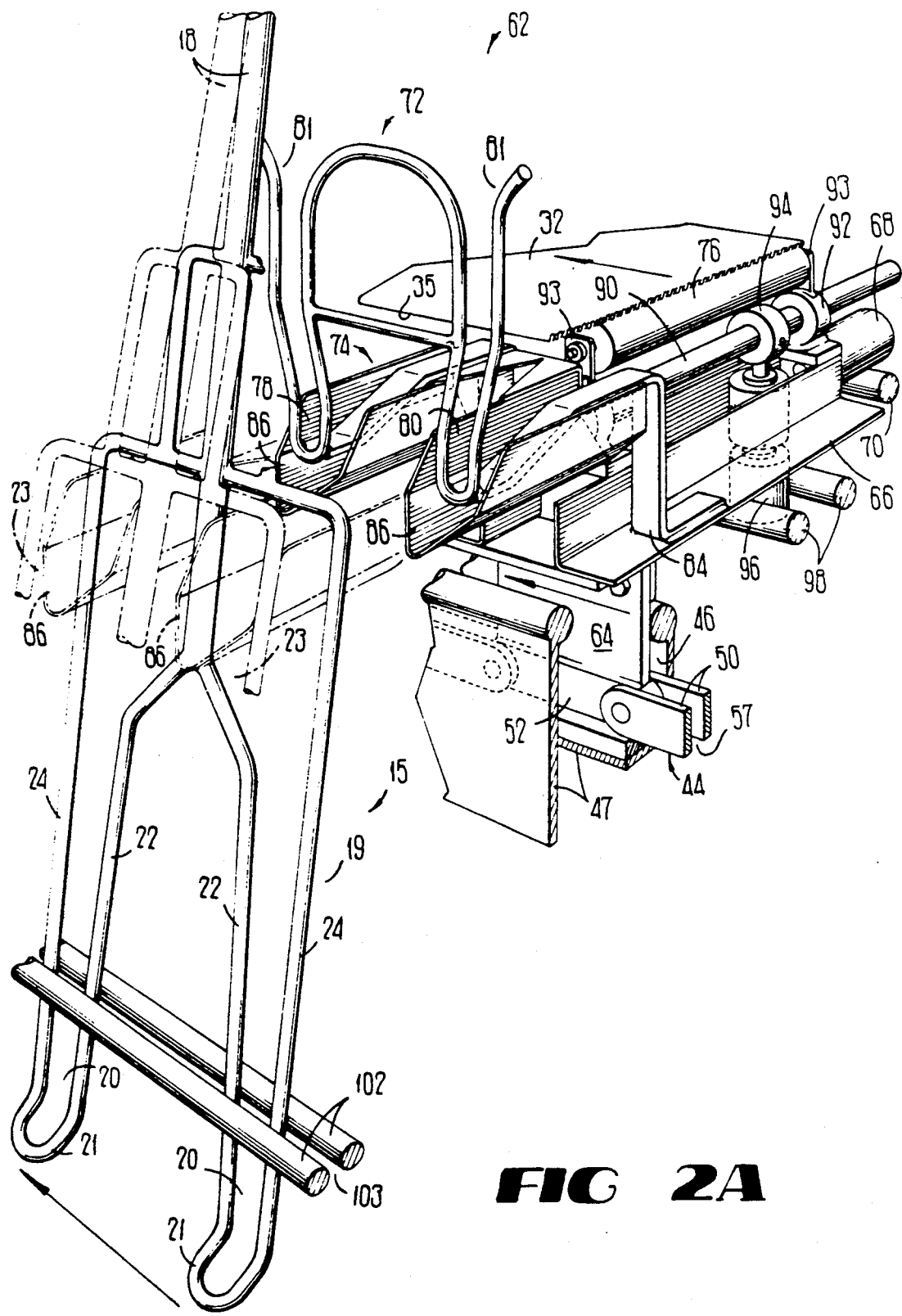
FIG. 2A is a fragmentary pictorial view showing a single loading station in the disclosed embodiment, the location thereof being indicated in FIG. 1A. The foot folder associated with the loading station is shown at its extended position by broken lines.

Turning first to FIGS. 1A, 1B, and 2A, there is shown generally at 14 an apparatus for loading fowl onto a succession of shackles 15 according to a preferred embodiment of the present invention. The conventional shackles 15 are suspended from an endless overhead conveyor track 16 (FIG. 6) and are moved along that track by a power-driven chain. The nature and construction of overhead conveyor systems used for transporting shackles through poultry processing plants is well known to those skilled in the art and need not be disclosed herein in further detail.

Figure 10:
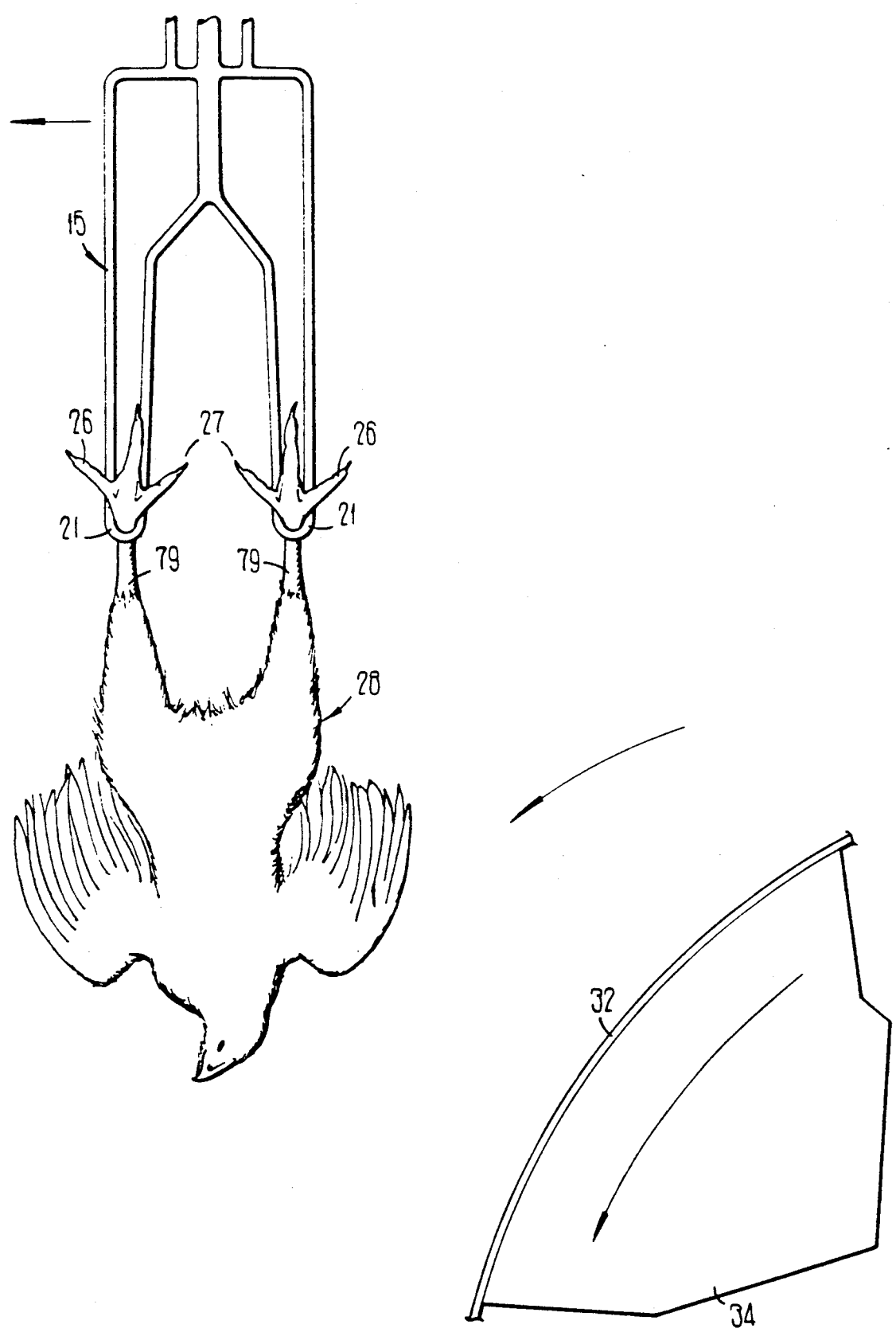
FIG. 10 is a fragmentary elevation view taken at location 10 on FIG. 1B, showing a fowl suspended from a shackle and leaving the loader.

Each individual shackle 15 is typical of those known in the prior art and currently used in poultry processing operations. As best seen in FIG. 2A, the shackle 15 has a rod 18 suspended from the conveyor track and supporting a wire frame structure 19 defining a pair of loops 20 for receiving the feet of a fowl suspended from the shackle as illustrated in FIG. 10. The lower ends 21 of the loops 20 are closed to engage the feet, and those lower ends are turned outwardly a sufficient extent so that the fowl hangs beneath the shackle at a desired attitude to facilitate further processing operations. The vertical frame wires 22 defining the inner side of each loop 20 have a slight inward taper away from the outer wires 24 so that the width of each loop increases toward the upper end of the loop. The upper ends of the wires 22 bend inwardly and join the lower end of the rod 18, defining an enlarged entry region 23 for each loop. The entry regions 23 provide a throat leading down to the corresponding loops 20, and although the entry regions are wider than the loops, the digits 26 (FIGS. 2B and 4B, for example) on the foot 27 of a typical fowl such as the bird 28 are splayed outwardly to an extent which will not allow an unrestrained foot to pass through the entry region 23.

The loader apparatus 14 includes a conveyor belt 32 supported by an idler wheel 33 (FIG. 1A) at the infeed end of the apparatus and by a drive wheel 34 (FIGS. 1B and 10) at the exit end thereof. The belt 32 is substantially flat in the present embodiment, and the upper side of that belt extends alongside the shackles 15 of the overhead conveyor so that a succession of the shackles 15 extends alongside and in lateral spaced-apart relation to one edge 35 of the belt. So that the speed and direction of the belt 32 are synchronized with the overhead conveyor, the drive wheel 34 is mechanically coupled to the overhead conveyor by means of a drive shaft 36 (FIG. 1B) extending downwardly from the drive sprocket 38 engaging the endless chain moving along the conveyor track associated with the shackles. The drive shaft 36 is connected to a right-angle drive 40 which rotates the drive wheel 34 and also rotates the sprocket 42 for a purpose described below.

Moving in synchronism with the conveyor belt 32 is the endless drive chain 44, best seen in FIG. 2A, the upper level of which slides in the open channel 46 defined by the stationary chain guides 47. The driven chain 44 comprises successive pairs of laterally-spaced links 50 pivotably attached to solid links 52. The chain 44 is carried by a drive sprocket 54 (FIGS. 1B and 9) located near the drive wheel 34 at the exit end of the loader, and an idler sprocket 55 (FIG. 1A) located near the idler wheel 33 at the infeed end thereof. Both the drive gear 54 and the idler sprocket 55 have peripheral teeth 56 spaced to fit the openings 57 (FIG. 2A) formed between pairs of open links 50 in the chain 44. Referring to FIG. 1B, the drive sprocket 54 is mounted on the drive shaft 58 chain-driven by the sprocket 42 associated with the drive wheel 34 for the bird conveyor belt 32, so that the drive chain 44 travels in synchronism with the bird conveyor belt and with the successive shackles 15 moving alongside the bird conveyor belt.

Figure 2B:
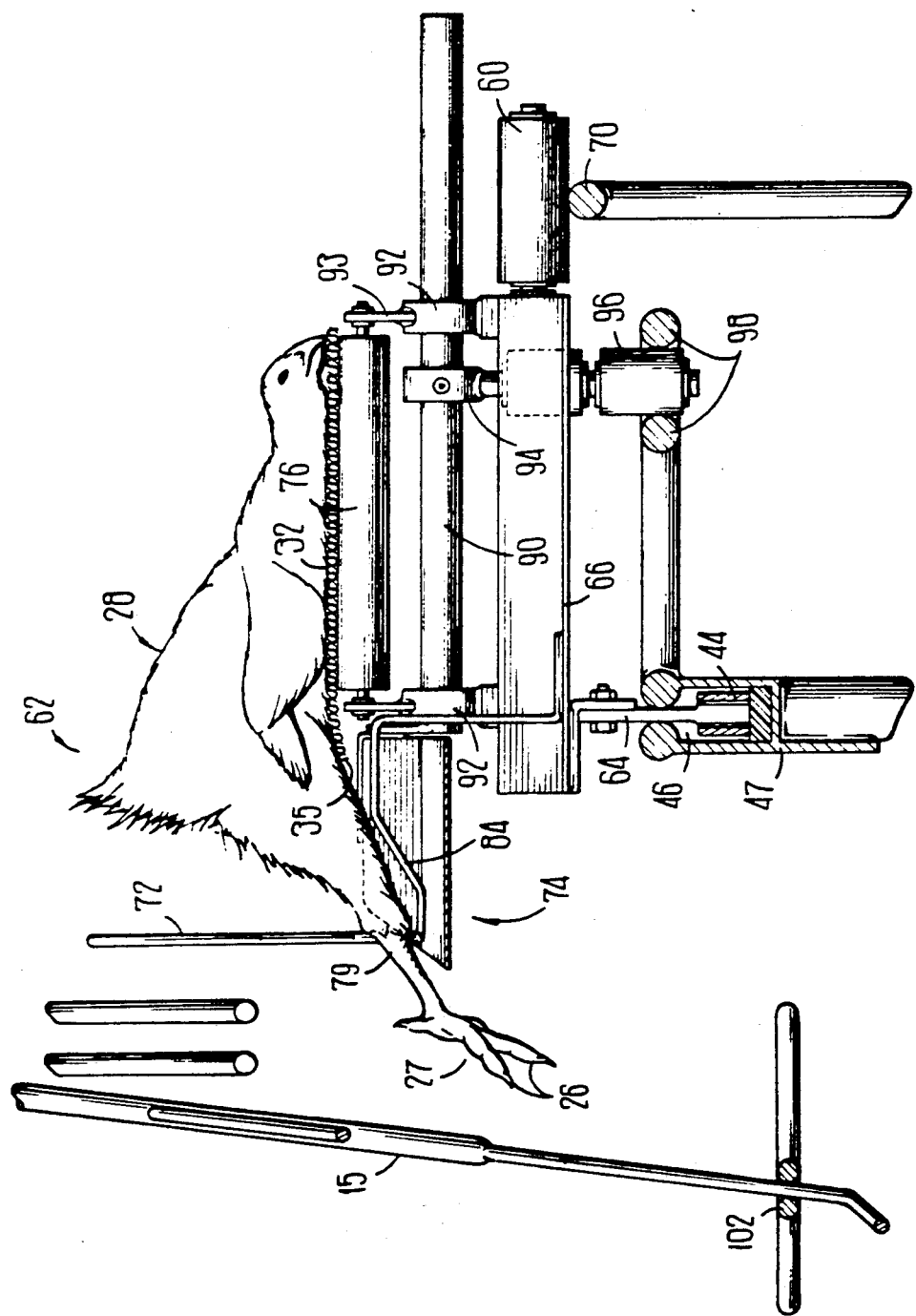
FIG. 2B is a vertical section view taken along line 2B—2B of FIG. 1B.

The drive sprocket 54 and idler sprocket 55 for the drive chain 44 are of smaller diameter than the wheels 33 and 34 which carry the belt 32, and those sprockets occupy a vertical plane approximately parallel with the one edge 35 of the belt as best seen in FIG. 1A and 1B. As a result, the drive chain 44 travels beneath the bird conveyor belt 32 adjacent the edge 35 thereof, as best seen in FIG. 2B.

The loader 14 has a number of successive bird loading stations 62 extending along the bird conveyor belt 32. The bird loading stations 62 correspond in number and in location to the successive shackles 15 extending alongside the loader 14 from a point designated by arrow 2A in FIG. 1B, and extending to the point where the drive chain 44 passes around the drive sprocket 54 near the exit end of the loader. An example of the bird loading stations 62 is shown in FIGS. 2A and 2B. Each bird loading station is supported in part by a plate 64 attached to one of the solid links 52 making up the drive chain 44 and extending upwardly through the open top of the channel 46 within which the drive chain travels. The plate 64 of each bird loading station 62 is connected to the near ends of a pair of support members 66 which extend across the width of the bird conveyor belt 32 at a location spaced below the upper flight of that belt (the lower or return flight of the bird conveyor belt is not shown). The far ends of the support members 66 engage the axle of the support roller 68 which travels along the stationary support rail 70 located on the side of the loader opposite the drive chain 44. The support members 66 of each bird loading station 62 thus travel beneath the upper flight of the bird conveyor belt 32 in synchronism therewith.

Each bird loading station 62 includes a leg guide 72 and a foot folder 74, both of which are carried by the support members 66 and move with the drive chain 44. The leg guide 72 and the foot holders 74 are positioned between the edge 32 of the bird conveyor belt and the corresponding shackle 15, as seen in FIG. 2B. Each bird loading station 62 also includes an idler roller 76 located immediately beneath the bird conveyor belt 72 and forming a support for the underside of that belt. Each idler roller 76 is mounted on structure carried by the support members 66, and so it will be understood that the idler rollers 76 travel with the bird loading stations 62 in synchronism with the belt, so that at most only nominal relative longitudinal movement takes place between the bird conveyor belt and the idler rollers. The purpose of the idler rollers is discussed below.

Each leg guide 72 comprises a unitary rod bent to form a pair of separate loops 78 and 80 having closed lower ends approximately in alignment with the entry regions 23 for the loops 20 of the corresponding shackle 15 as shown in FIG. 2A. The upper ends of the loops 78, 80 are open to receive the legs 79 of a bird as described below, and the ends 81 of the rod making up the leg guide 72 are flared outwardly to assist in guiding the legs into the loops. Each leg guide 62 is attached to the corresponding bird loading station 62 by a pair of Z-shaped brackets 84 connected at the lower ends of the loops 78, 80 and extending laterally toward the edge 35 of the belt 32 and downwardly from the loops for attachment to the respective support members 66. The leg guides 62 as shown thus travel with the bird loading stations 62 but do not undergo motion relative to those stations, although an alternative construction can be used as described below.

The foot folder 74 for each bird loading station 62 comprises a pair of open-topped troughs 86. These troughs are spaced apart from each other a distance parallel to the length of the bird support belt 32 so that each trough is aligned with one of the loops 78 and 80 for the leg guide 72, and the troughs are positioned in elevation so that the lower ends of those loops extend downwardly through the open tops of the troughs. Each trough 86 has a longitudinal extent which runs parallel to the width of the bird conveyor belt 32. The end of each trough 86 remote from the support member 66 is open to accommodate the leg of a fowl as shown in FIG. 2B and as described below. Each trough is long enough and deep enough to confine the normally-splayed digits 26 to an area which will fit within the entry regions 23 of a shackle 15.

Figure 3:
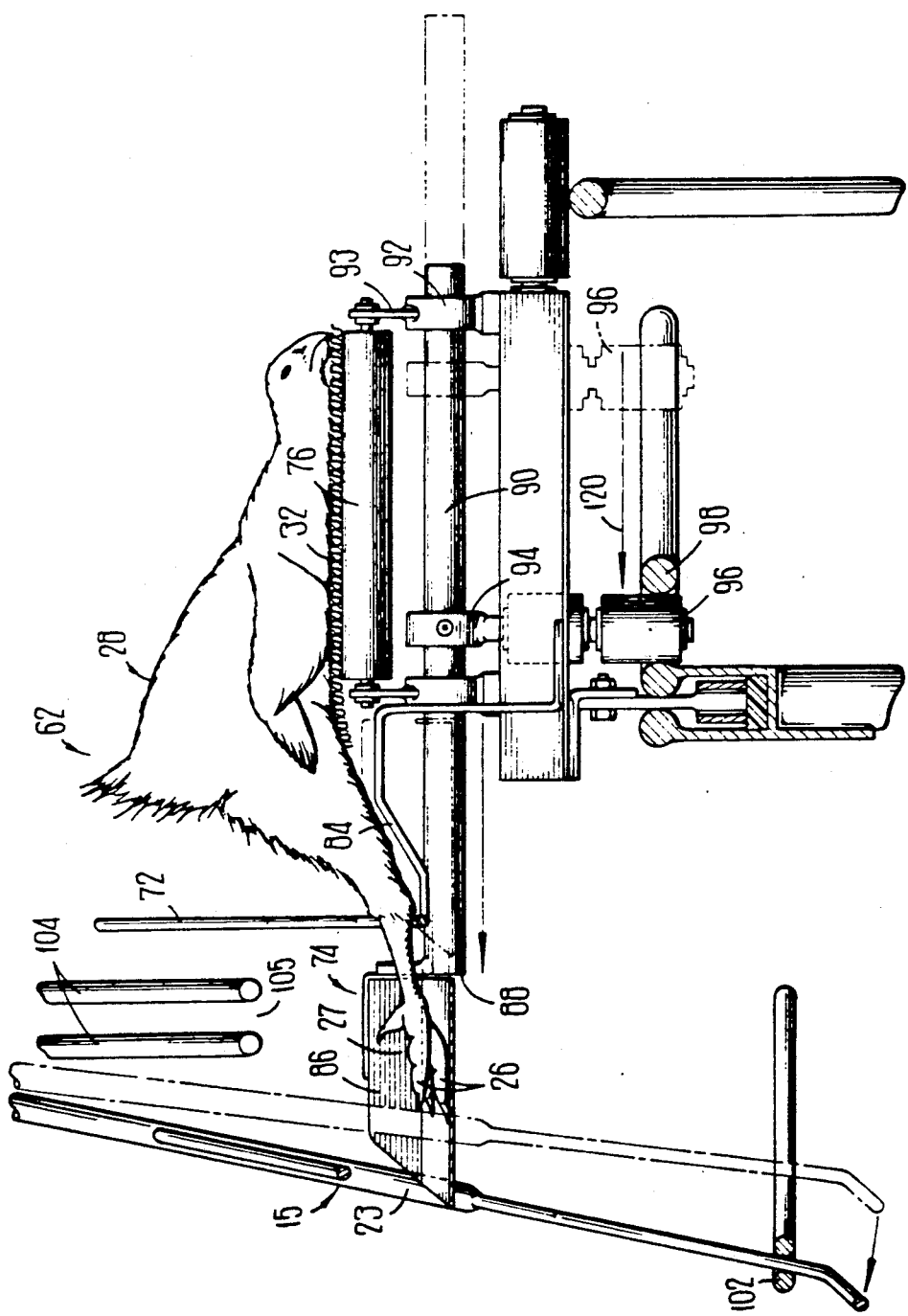
FIG. 3 is a vertical section view taken along line 3—3 of FIG. 1B.

The troughs 86 of an individual bird loading station 62 are selectively movable in unison between a retracted position shown in FIG. 2B and with solid lines in FIG. 2A, and an extended position shown with broken line in FIG. 2A and with solid line in FIG. 3. To accomplish that movement, each pair of troughs 86 is mounted at one end 88 of a reciprocating shaft 90 which extends beneath the bird conveyor belt 32 and parallels the width of that belt. Each shaft 90 is supported for axial movement by a pair of bearings 92 which in turn are mounted on the support members 66 located below the shaft 90. The housings of the bearing members 92 also provide a convenient location for mounting the brackets 93 supporting idler roller 76 which supports the bird conveyor belt 32.

A clamp 94 tightly grips the shaft 90 between the bearings 92. A shaft extends below the clamp 94 and supports a roller 96 which extends downwardly at a perpendicular to the shaft 90, the roller passing between the two spaced-apart support members 96 and disposed between the pair of stationary cam tracks 98 located below the support members 66. As best seen in the upper portion of FIG. 1B, the cam tracks 98 extend along part of the bird conveyor belt 32 and the lateral position of the cam tracks varies from one side to the other of the bird conveyor belt 32 at different locations along the length of the loader 14. The roller 96 of each bird loading station 62 travels along the cam tracks 98 as the drive chain 44 moves the bird loading station. When the cam tracks are located at maximum spacing to the right of the drive chain 44 as shown in FIGS. 2A and 2B, the roller 96 moves the shaft 90 to a position which retracts the foot folder 74, so that the foot folder is in its closest lateral proximity to the edge 35 of the bird conveyor belt 32. However, as forward movement of the bird loading station 62 carries the roller 96 to a portion of the cam tracks 98 which is relatively close to the drive chain, as seen in FIG. 3 and in phantom view in FIG. 4, the shaft 90 translates leftwardly as viewed in that figure and extends the troughs 86 as shown in those figures.

The loader 14 is installed adjacent a portion of the shackle conveyor system associated with a poultry processing plant such that the shackles 15 travel along one side of the loader, as best understood in FIGS. 1A and 1B. The overhead conveyor track for the shackles preferably approaches the loader 14 along a path 100 (FIG. 1B) at an angle to the longitudinal axis of the loader and at the location 2A spaced a distance downline from the infeed end thereof as shown in FIG. 1A, thereby allowing room for one or more human operators at the infeed end to position the arriving birds at the bird loading stations.

As best seen in FIGS. 1A and 1B, the lateral spacing between the individual shackles 15 and the corresponding bird loading stations 62 of the loader 14 varies as the shackles move alongside the loader. The lateral positioning of the shackles 15 is controlled by the lower guide bars 102, FIGS. 2A and 3, and by the upper guide bars 104 best seen in FIGS. 3 and 4A. Neither the lower nor upper guide bars are shown in FIG. 1B because of space limitations in that figure. Both the lower and upper guide bars extend in longitudinal alignment with the bird conveyor belt 32. The lower guide bars 102 comprise a pair of bars closely spaced apart from each other to define a gap 103 positioned to receive the loops 20 of each shackle 15 as that shackle arrives at position 2A. The lower guide bars 102 engage the shackles near the lower ends of the loops 20 and maintain the shackle at a desired lateral spacing apart from the bird conveyor belt 32 as the shackle slides along the gap 103 defined by the lower guide bars.

Figure 7:
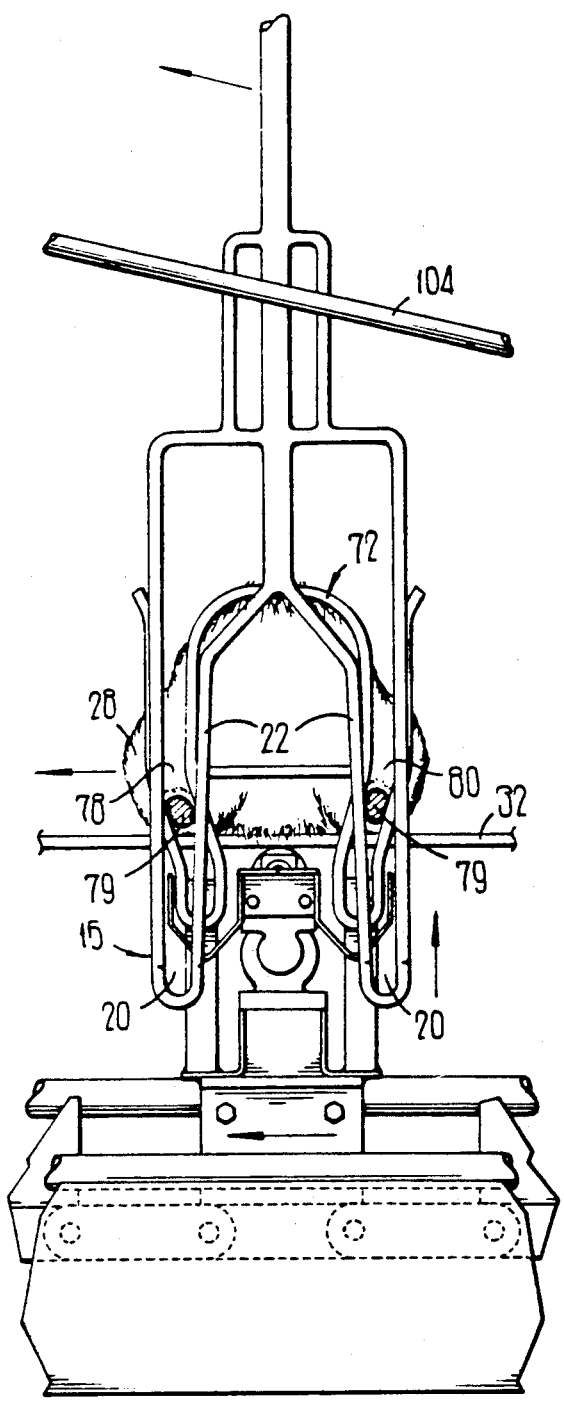
FIG. 7 is a fragmentary elevation view taken at location 7 shown on FIG. 1B.

The upper guide bars 104 likewise comprise a pair of bars spaced apart from each other to define a gap 105 sufficient to receive upper portions, including the rod 18, of each shackle 15. Although both the lower and upper guide bars can engage individual shackles at a given location as illustrated in FIG. 4, the shackles also become elevated relative to the bird conveyor belt 32 at subsequent longitudinal locations along the loader, raising the shackles above the level of the lower guide bars 102. However, the upper guide bars 104 maintain the appropriate lateral position of the shackles in elevated position, as shown by FIGS. 5, 6, and 7, as the shackles slide along the gap 105 between the upper guide bars.

It will now be apparent that the path 100 of the overhead conveyor track approaches the loader 14 at a location 2A somewhat downstream from the head end 108 of the loader, as shown in FIG. 1B. The absence of shackles 15 moving alongside the loader at the head end 108 provides room for one or more operators 110 to stand alongside the loader as the bird loading stations 62 move in unison with the bird conveyor belt 32. That motion occurs in the leftward direction as viewed in FIG. 1A, but it should be understood that the direction of movement of the disclosed embodiment is not critical and that apparatus according to the present invention can be made for movement in the direction opposite that shown.

Positioned a distance behind the bird conveyor belt 32 is the infeed conveyor 112, only a terminal portion of which is shown in FIG. 1A. The infeed conveyor 12 may be a conventional flat belt conveyor which preferably moves in the direction opposite to movement of the bird conveyor belt 32 and the drive chain 44. A smooth shelf 114 occupies the space between the terminal end of the infeed conveyor 112 and the head end 108 of the bird conveyor belt 32. The upper surface of the infeed conveyor 112 preferably is elevated somewhat above the corresponding surface of the bird conveyor belt 32, and the shelf 114 slopes downwardly from the near edge 116 of the infeed conveyor to the confronting far edge 118 of the bird conveyor belt. The infeed conveyor 112 extends a distance upstream from the terminal end, shown in FIG. 1A, to a location (not shown) where the fowl are delivered to the processing plant in the conventional manner.

The operation of the loader 14 is now considered with initial reference taken to FIG. 1A. Individual birds are removed from crates or the like at a location not shown and are placed on the infeed conveyor 112. The birds preferably are placed on the infeed belt 112 with their legs pointing toward the near edge 116 of the infeed conveyor. It has been found in practice, contrary to what one might expect, that the birds usually remain inactive on the moving infeed conveyor 112, perhaps due to the motion and vibration of the infeed conveyor belt. The birds 28 thus arrive at the terminal end of the infeed conveyor 112 as shown in FIG. 1A, where one or preferably several operators 110 are standing alongside the head end 108 of the loader. Each operator 110 can reach across the bird conveyor belt 32 and grasp a bird 28 by the digits of its feet, sliding the bird off the infeed conveyor 112 and across the shelf 114 to reposition the bird onto the bird conveyor belt 32 at one of the bird loading stations 62.

The operator positions the bird 28 at a bird loading station so that the feet 27 of the bird extend through the loops 80 of the leg guide 72 associated with that bird loading station. The foot folder 74 at this position of the bird loading station is retracted as shown with solid lines in FIG. 2A, and the feet of the bird thus extend through the leg guides 72 with the digits 26 splayed outwardly on the side of the leg guide opposite the bird, as seen in FIG. 2B and occurring downline from the head end 108 of the loader. Relatively little time and effort is required of the operator 110 to place each bird 28 at a bird loading station, inasmuch as the operator need only move the bird from the infeed conveyor 112 onto the bird conveyor belt 32 and then position the legs of the bird into the leg guide 72 with a single downwardly motion of the legs. Each bird loading station arriving at the head end 108 should thus receive a bird 28 arriving on the infeed conveyor 112, although for illustrative purposes only a few birds are shown loaded in FIG. 1A.

With a bird 28 thus positioned at a particular bird loading station 62, the bird conveyor belt 32 and the bird loading station are conveyed along the loader to the location 2A shown at the upper-right portion of FIG. 1B, where the path 100 of the overhead conveyor line first moves a shackle 15 into spaced-apart relation alongside the bird conveyor belt. The lower part of the shackle 15 at this time engages the lower guide bars 102, which tip the shackle outwardly and away from the loader including the leg guide 72, a position as shown in FIG. 2B. It should be understood that the digits 26 on the feet of the bird 28 remain splayed outwardly at this time, so that the feet could not move into the entry regions 23 of the shackle 15 without interference with the shackle.

The bird now progresses forwardly from the position shown in FIG. 2B to that shown in FIG. 3. With reference to FIG. 1B, it is seen that the cam tracks 98, located beneath the upper surface of the bird conveyor belt 32, move the roller 96 of each bird loading station 62 toward the edge 35 of the bird conveyor belt 32 as the bird loading stations in turn move from the position of FIG. 2B to that of FIG. 3. This lateral movement of the roller 96 carries the clamp 94 and the shaft 90 to the left as shown by the motion arrow 120 in FIG. 3. The troughs 80, which are attached to one end of the shaft 90, thus are extended from the position shown with solid lines in FIG. 2A to the position shown with broken lines in that figure and shown by solid lines in FIG. 3. This outward movement of the foot folder 74 causes each trough 86 to move beneath a corresponding loop 80 of the leg guide 72, so that each trough moves into an extended position wherein the trough envelopes the digits 26 of the fowl. The open-topped troughs 86 are configured to fold and contain the digits 26 of each foot to an area which will permit unimpeded movement of the feet through the corresponding entry regions 23 of the shackle 15.

Figure 4A:
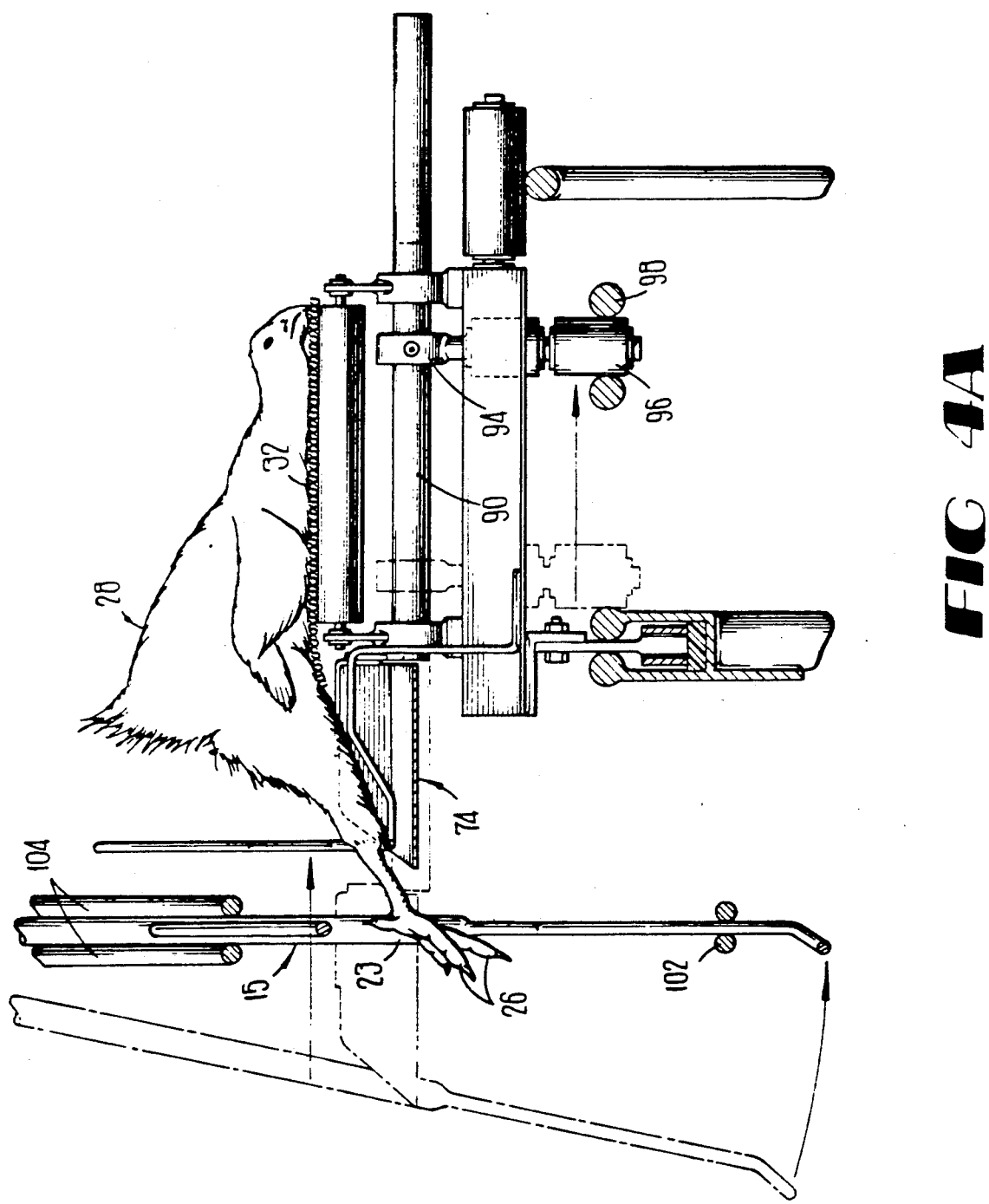
FIG. 4A is a vertical section view taken along line 4A—4A of FIG. 1B.
Figures 4B, 5:
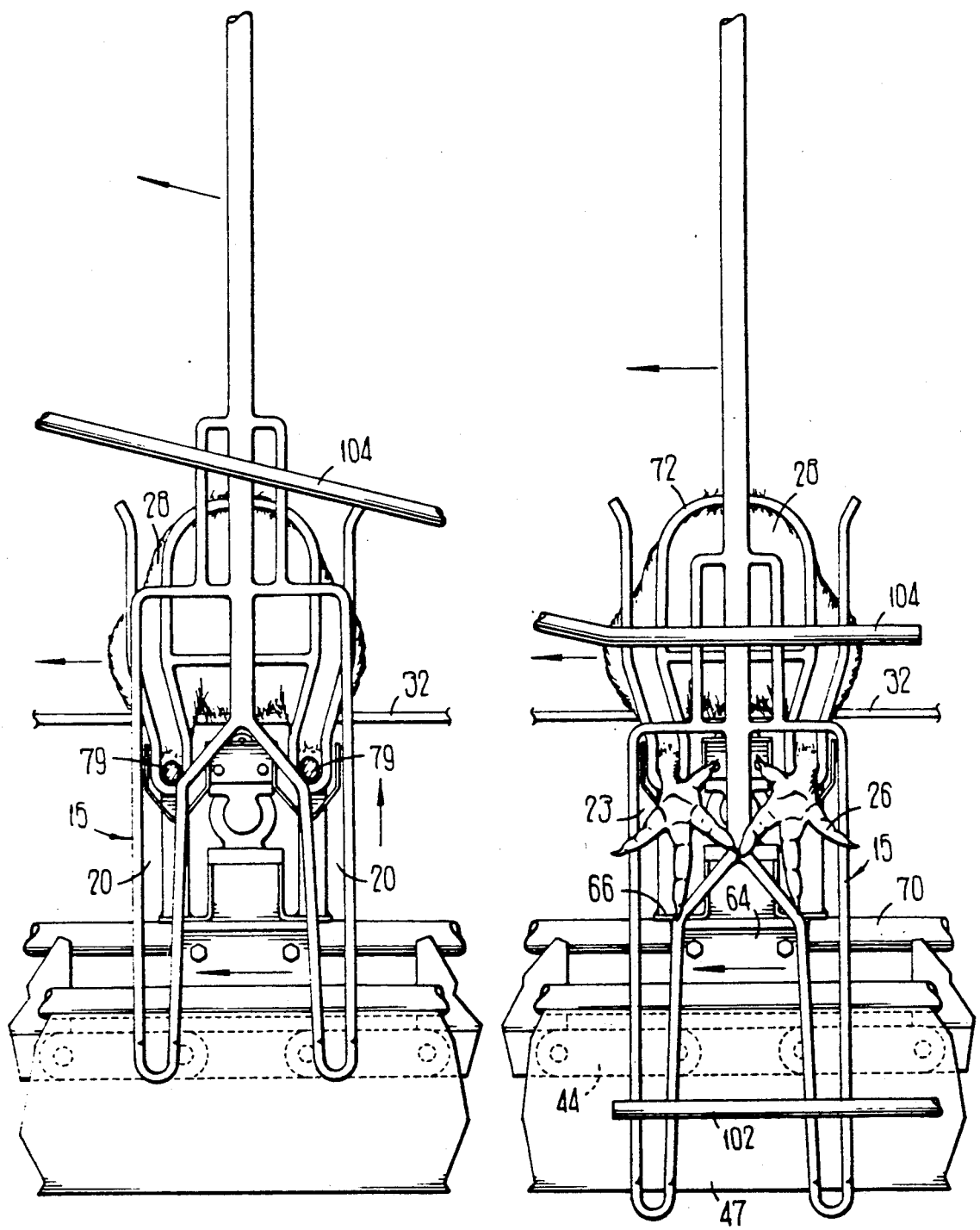
FIG. 4B is a fragmentary elevation view taken at point 4B on FIG. 1B.
FIG. 5 is a fragmentary elevation view taken at point 5 on FIG. 1B.
Figure 6:
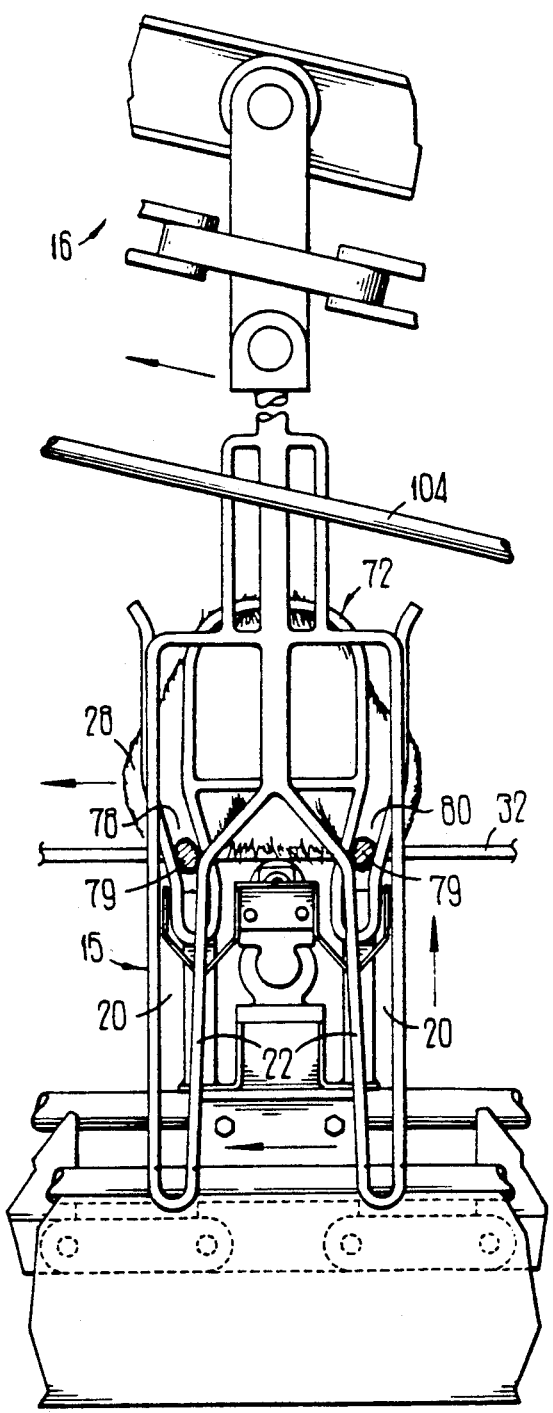
FIG. 6 is a fragmentary elevation view taken at location 6 shown on FIG. 1B.

With the feet of the bird thus contained within the troughs 86 of the foot folder 74, the bird conveyor belt 32 and the bird loading station 62 continues movement to reach the position shown at FIGS. 4A and 4B. From viewing the location of the cam tracks 98 when moving from the location of FIG. 3 to the location of FIGS. 4A/4B, it will be seen that the cam tracks are angled back from the edge 35 toward the far edge 118 of the bird conveyor belt. The cam tracks 98 thus cause the foot folder 74 to return to the retracted position as the bird loading station moves toward position 4A/4B. However, during this same extent of travel the lower guide bars 102 are angled inwardly toward the bird conveyor belt 32 so that the shackle 15 likewise laterally moves toward the near edge 35 of the conveyor belt. The lower guide bars 102 are positioned so that the shackle 15 moves toward the near edge 35 of the bird conveyor belt more rapidly than the cam tracks 98 retract the foot folder 74. As a result, the shackle 15 moves laterally to a point where the troughs 86 of the foot folder 74 become positioned within the corresponding entry regions 23 at the upper ends of the loops 20 formed by the shackles. This relative positioning of the shackle 15 and the foot folder 74 is best seen by reference to FIG. 3 and the broken-line illustration of the shackle therein, and FIG. 4A and the broken-line illustrations therein. With the digits of the bird contained within the troughs 86 of the foot folder, the normally-splayed digits do not cause interference as the shackle is moved laterally toward the foot folder and the bird 28.

FIG. 4B shows the condition of the loading process once the shackle 15 has moved inwardly toward the bird conveyor belt 32 and the foot folder 74 has retracted. At this time the feet of the bird extend through the entry regions 23 of the shackle and the digits 26 have returned to their normal splayed configuration. The lower guide bars 102 remain in contact with the lower end of the shackle 15 at this time, but the shackle also has longitudinally moved into engagement by the upper guide bars 104. These upper guide bars maintain the desired spacing between the shackles and other elements of the loader 14 as the shackles are elevated to withdraw the bird from the bird conveyor belt.

FIGS. 5 through 9 illustrate several stages in elevation of the shackle 15. As earlier stated, this elevation takes place because the overhead conveyor track 16 (FIG. 6) for the shackles is angled upwardly at a point commencing with FIG. 5. As each shackle 15 begins to move upwardly in relation to the bird conveyor belt 32, the upper guide bars 104 likewise are pitched upwardly to remain in contact with the shackles and maintain the desired lateral spacing between the shackles and the bird conveyor belt. FIG. 5 shows this arrangement and also shows that the lower guide bars 102 do not extend to this location because the shackles are elevated above the position of the lower guide bars. FIG. 5 also illustrates that upward movement of the shackle relative to the bird 28, bringing the legs 79 of the bird to the threshold of the loops 20 formed by the shackle. The legs 79 remain held in place by the leg guide 72 of the corresponding bird loading station 62 at this time.

FIGS. 6 and 7 further illustrate the progressive upward movement of the shackle 15 relative to the bird conveyor belt 32 and the bird 28 supported on that belt, as the bird conveyor belt and the shackles continue their forward movement. In FIG. 6 the wires 22 that define the inner side of the loops 20 have moved into contact with the legs 79 of the bird, displacing those legs upwardly from the bottoms of the loops 80 now within the foot folder 74. The loops 80 are flared outwardly and upwardly from their bottom ends, as seen in FIG. 6, to accommodate this displacement of the legs 79 as the shackle is elevated relative to the bird 28.

Further elevation of the shackle 15 is shown in FIG. 7. At this point in the loading process, the legs 79 of the bird have entered the loops 20 of the shackle 15 and have become correspondingly displaced upwardly within the loops 78 of the leg guide 72. However, the bird 28 remains supported on the bird conveyor belt 32 at this time; upward movement of the legs 79 up to this point is accommodated by the range of natural movement in the joint between the legs and body of the bird.

Figures 8, 9:
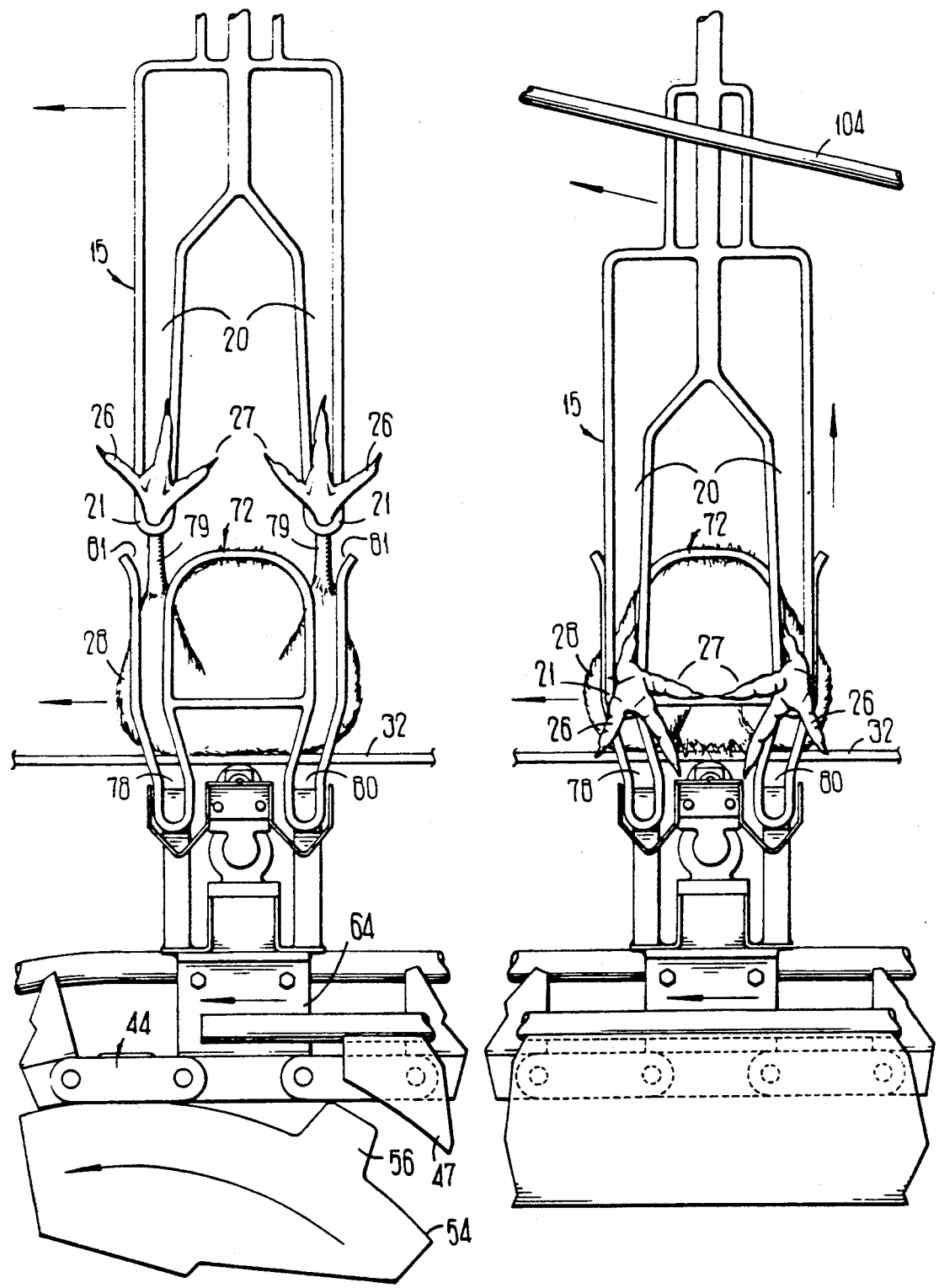
FIG. 8 is a fragmentary elevation view taken at location 8 shown on FIG. 1B.
FIG. 9 is a fragmentary elevation view taken at location 9 shown on FIG. 1B.

FIG. 8 shows the shackle 15 raised to an elevation where the legs of the bird are at the bottom of the loops 20 in the shackle. The body of the bird remains on the bird conveyor belt 32 as the shackle 15 continues relative upward movement in its travel alongside the bird conveyor belt. It is also seen that the upper guide bars 104 remain in contact with the shackle 15 at the location shown in FIG. 8, so as to maintain the desired lateral spacing between the shackle and the bird conveyor belt.

Moving now to the location shown in FIG. 9, the shackle 15 has attained maximum elevation relative to the bird conveyor belt 32 and the bird 28. The legs 79 of the bird now are completely raised from the ends 81 of the leg guide, and the digits 26 remain splayed outwardly to retain each foot 27 within the lower ends of the loops 20 in the shackle 15. At this point, the drive chain 44 and thus the bird loading station 62 is approaching the drive sprocket 54 which will rotate the drive chain and the bird loading station 180° for return to the head end 108 of the loader. The body of the bird 28 remains supported on the bird conveyor belt 32, which extends forwardly beyond the drive sprocket 54 to the belt drive wheel 34 as shown in FIG. 1B.

The shackle 15 remains at the elevation shown in FIG. 9 and continues forward movement in unison with the bird conveyor belt 32 until that belt passes over the drive wheel 34. At that location the bird conveyor belt falls away from the bird 28, allowing the body of the bird to hang downwardly from the legs 79 as the digits 26 continue to hold the bird within the loops of the shackle. The bird thus is fully loaded on the shackle, which moves the bird to the first post-loading step in the processing plant.

It should now be apparent that the present apparatus and method for loading live fowl onto the shackles of an overhead conveyor line is a significant improvement over the past practices. Operators using the present loader are able to work more efficiently because they only place each bird on the bird conveyor belt with its legs inserted in a foot folder, instead of manually folding the digits while inserting the feet within the moving shackles as in the prior art. Moreover, loading birds with the present apparatus should be less unpleasant and less hazardous for the operator, as the time needed to handle each bird is reduced and because the operator is not required to hold the bird while placing its feet into a shackle moving along the conveyor line.

It should be understood that changes may be made to the disclosed embodiment without departing from the spirit and scope of the invention as defined in the following claims. For example, the leg guides 72 which are disclosed in fixed relation to the corresponding bird loading stations could instead be modified to pivot or otherwise become displaced in relation to the bird loading station, at various positions between the infeed and exit ends, so that the leg guide is in operative position only when actually needed to position the legs of the bird.

Still other changes and modifications to the disclosed embodiment may be apparent to those of ordinary skill in the art. Accordingly, the spirit and scope of the present invention is defined only by the following claims.

What is claimed is:

1. The method of loading fowl onto shackles having loops to engage the feet of the fowl, comprising the steps of:
    placing a fowl with its feet in predetermined relation to a shackle moving along a certain path;
    confining the digits of each foot to a certain outline shape corresponding to the width of an entry portion of the corresponding loops of the shackle;
    while the digits are contained, moving the shackle relative to the fowl so as to align the feet with the loops; and then
    increasing the vertical distance between the fowl and the shackle until the feet of the fowl become engaged in the loop of the shackle.

2. The method as in claim 1, wherein the shackle comprises one of a plurality of such shackles moving along a conveyor line; and
    the step of placing the fowl with its feet in predetermined relation to the shackle comprises placing the fowl on a secondary conveyor traveling with the shackles adjacent a portion of the conveyor line, so that the step of moving the shackles relative to the feet takes place while the fowl is traveling adjacent a shackle.

3. The method as in claim 2, wherein movement of the shackle relative to the fowl takes place along a path substantially perpendicular to the path of travel of the conveyor line.

4. The method as in claim 2, wherein:
    the shackle is in lateral spaced relation to the secondary conveyor as the digits of the feet are contained; and
    the step of moving the shackle relative to the fowl comprises reducing the spacing between the shackle and the secondary conveyor so that the legs of the fowl become in alignment with the loops of the shackle.

5. The method as in claim 1, wherein movement of the shackles relative to the fowl takes place along a path substantially perpendicular to the path of travel of the conveyor line.

6. The method as in claim 1, wherein:
    the shackle is in lateral spaced relation to the feet of the fowl as the digits of the feet are confined; and
    the step of moving the shackle relative to the fowl comprises moving the shackle toward the secondary conveyor so that the loops of the shackle become in alignment with the legs of the fowl.

7. The method of loading fowl onto shackles moving along a predetermined path and having means to engage the feed of the fowl, comprising the steps of:
    moving the fowl along the path of the shackles while the shackles are maintained spaced apart from the fowl;
    confining the digits of each foot so as to permit unimpeded movement of the feet into predetermined relation with the corresponding loops of a selected shackle;
    moving the shackle relative to the fowl to reduce the spacing between the fowl and the shackle while the digits are confined, so that the feet move into alignment with the loops and are disposed to engage the loops; and then
    engaging the feet in the means of the shackle.

8. The method as in claim 7, wherein:
    the feet are confined by containing the digits of each foot to a certain shape which permits moving the feet into predetermined relation with the shackle.

9. Apparatus for loading fowl onto shackles moving along a predetermined path and having means to engage the feet of the fowl, comprising:
    means for moving the fowl adjacent the path of the shackles while the shackles are spaced a distance apart from the fowl;
    means for confining the digits of each foot so as to permit unimpeded movement of the feet into predetermined relation with the engaging means of a selected shackle; and
    means for reducing the distance between the fowl and the shackle while the digits reamin confined, so that the feet move into predetermined alignment with the engaging means.

10. Apparatus as in claim 9, further comprising:
    means for increasing the vertical separation between the fowl and the shackle after the feet are in alignment with the engaging means so that the feet of the fowl become engaged therein.

11. Apparatus as in claim 10, wherein:
    the means for moving the fowl along the path of the shackles comprises a secondary conveyor for receiving the fowl and located alongside the predetermined path of the shackles; and further comprising
    means for providing a selected distance between the shackles and the secondary conveyor during a first part of the secondary conveyor so that the confining means can contain the digits of the feet of the fowl; .
    means for reducing the selected distance between the shackles and the fowl at a second part of the secondary conveyor so that the feet become in predetermined alignment with the means of the shackle; and
    the means for increasing vertical separation comprises means for elevating the shackle with respect to the secondary conveyor, whereby the legs of the fowl become engaged by the shackles and the shackels withdraw the fowl from the secondary conveyor for further processing.

12. Apparatus as in claim 10, wherein:
    the means for confining the digits of a foot comprises a foot folder movable with the fowl along the path, and selectively movable between a first position to receive legs of the fowl and as second position wherein the foot folder moves along the legs to extend adjacent the digits of the feet and confine those digits to a certain outline shape which does not interfere with an entry portion of the shackle; and
    means associated with the foot folder for moving the foot folder to the second position as the shackle is moved to reduce the distance between the shackle and the fowl, so that the digits of the foot are confined and the shackle thereby can move into alignment between the engaging means and the feet of the fowl.

13. Apparatus as in claim 9, further comprising:
    means for receiving the legs of a fow moving along the path of the shackles so as to position the legs in predetermined relation to a selected shackle.

14. Apparatus as in claim 13, wherein:

the means for receiving the legs is operative to move along the path with the selected shackle.

15. Apparatus as in claim 13, wherein:
the means for confining digits of a fowl is selectively operative to engage and confine the digits of a fowl whose legs are positioned by the receiving means.

16. Apparatus as in claim 13, wherein:
the means for confining digits comprises a foot folder aligned with the leg receiving means and selectively movable between a first position to receive the legs of a fowl positioned by the leg receiving means and a second position whrein the foot folder moves along the legs to confine the digits to a configuration which permits positioning the feet into predetermined relation with the engaging means of the selected shackle.

17. Apparatus as in claim 16, wherein:
the means for receiving legs and the means for confining digits are operative to move adjacent the path with the selected shackle.

18. Apparatus as in claim 13, further comprising:
a plurality of said means for receiving the legs of fowl, each such means being aligned in predetermined relation to a corresponding shackle moving along the path and each being operative to position the legs of separate fowl in predetermined relation to the corresponding shackle; and
a plurality of said means for confining digits, each such means being operatively associated with a corresponding leg-receiving means.

19. Apparatus as in claim 13, wherein:
the means for moving the fowl adjacent the path of the shackles comprises a secondary conveyor for receiving the fowl and located alongside the predetermined path of the shackles; and further comprising
a plurality of said means for receiving the legs of fowl, each such receiving means being aligned in predetermined relation to a corresponding shackle moving along the path and each being operative to position the legs of separate fowl in predetermined relation to the corresponding shackle; and
a plurality of said means for confining digits, each such confining means being operative to engage and confine the digits of a leg positioned by a corresponding leg-receiving means.

20. Apparatus as in claim 19, wherein:
the means for receiving legs and the means for confining digits are operative to move with the secondary conveyor alongside the path of the shackles.

21. Apparatus as in claim 19, wherein:
the secondary conveyor comprises a surface on which the fowl are placed to move alongside the shackles;
the plural means for receiving the legs of the fowl move with the secondary conveyor and are arranged in succession at a side of the conveyor surface to receive the legs of plural fowl placed on the surface; and
the correspondign plural means for confining digits move with the secondary conveyor and are arranged in succession at the side of the surface to selectively confine the digits of the plural fowl.

22. Apparatus as in claim 21, further comprising:
actuating means located beneath the surface of the secondary conveyor and opertively associated with the digit-confining means to selectively move the digit-confining means between a first position to receive the legs of a fowl positioned by the leg receiving means and a second position wherein the foot folder moves along the legs to contain the digits to a configuration which permits movement of the feet into predetermined relation with the engaging means of the selected shackle.

23. Apparatus as in claim 21, further comprising:
the means for reducing the distance between the fowl and the shackles comprises guide means engaged by successive shackles to maintain the shackles spaced said distance apart from the fowl as corresponding confining means successively operate to confine the digits to a configuration which permits movement of the feet into predetermined alignment with the engaging means of the shackle, and then to move successive shackles toward the secondary conveyor so that the shackles are disposed in said predetermined alignment with the confined digits.

24. Apparatus as in claim 23, wherein:
the guide member is a first such member defining a guide path engaged by a lower portion of the shackles; and further comprising
means for elevating the successive shackles after the feet are in predetermined alignment with the engaging means, so that the feet of the fowl become engaged therein for removal of the fowl from the secondary conveyor; and
a second member defining a quide path engaged by the elevated shackles and maintaining the shackles in predetermined relation to the secondary conveyor as the shackles remove the fowl from the secondary conveyor.

25. Apparatus for loading fowl onto shackles moving along a predetermined path and having means to engage the feet of the fowl, comprising:
means for receiving the fowl with its feet in predetermined relation to a selected shackle moving along the path while the shackle is spaced a distance apart from the fowl;
means for confining the feet to permit unimpeded placement of the feet into predetermined relation with the engaging means of the selected shackle; and
means for moving the selected shackle relative to the fowl so that the feet become engaged by the engaging means.

26. Apparatus as in claim 25, wherein:
the receiving means is operative to receive a succession of fowl at an entry location and to move those fowl alongside corresponding shackles;
the confining means is operative downstream from the entry location; and
the means for moving the shackles comprises guide means operative to maintain the shackles at a predetermined lateral distance from the legs of the fowl at the entry region and to reduce the lateral distance as the fowl are moved by the receiving means to the downstream location, so that the feet are placed into predetermined alignment with the engaging means and thus are disposed for engagement by the engaging means.

27. Apparatus as in claim 25, wherein:
the receiving means is operative to receive a succession of fowl at an entry location and to move those fowl alongside corresponding shackles;
the confining means comprises plural such means for confining the feet of the successive fowl; and the means for moving the shackles comprises guide means operative to maintain the shackles at a predetermined lateral distance from the legs of the fowl and to reduce the lateral distance as the fowl move along the receiving means, so that the feet of successive fowl are placed into predetermined alignment with the engaging means of corresponding successive shackles and thus are disposed for engagement by the engaging means.

28. Apparatus as in claim 27, wherein:

the engaging means of the shackles comprise loops for receiving the feet of the fowl; and
the guide means are operative to move the successive shackles toward the confining means as the fowl move along the receiving means, so that the loops of the shackles move into predetermined alignment with the feet while the digits on the feet of the fowl are confined to fit within the loops.

29. Apparatus as in claim 28, wherein:

the means for moving the selected shackle further comprises means for elevating the successive shackles after the loops are in predetermined alignment with the feet, so that the fowl are suspended from the shackles.

* * * * *